US009549087B2

(12) United States Patent
Basil

(10) Patent No.: US 9,549,087 B2
(45) Date of Patent: *Jan. 17, 2017

(54) SYSTEM AND METHOD FOR GUARANTEED HIGH SPEED FAX DELIVERY

(71) Applicant: Axacore, Inc., San Diego, CA (US)

(72) Inventor: Nicholas J. Basil, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/514,854

(22) Filed: Oct. 15, 2014

(65) Prior Publication Data

US 2015/0103378 A1    Apr. 16, 2015

Related U.S. Application Data

(60) Provisional application No. 61/891,341, filed on Oct. 15, 2013, provisional application No. 61/927,716, filed on Jan. 15, 2014.

(51) Int. Cl.
| H04M 11/00 | (2006.01) |
| H04N 1/00 | (2006.01) |
| H04N 1/327 | (2006.01) |
| H04N 1/333 | (2006.01) |
| H04N 1/41 | (2006.01) |

(52) U.S. Cl.
CPC ...... *H04N 1/00209* (2013.01); *H04N 1/00214* (2013.01); *H04N 1/32789* (2013.01); *H04N 1/33392* (2013.01); *H04N 1/41* (2013.01); *H04N 2201/0039* (2013.01); *H04N 2201/0093* (2013.01); *H04N 2201/3218* (2013.01)

(58) Field of Classification Search
CPC ............ H04N 1/00209; H04N 1/00214; H04N 1/00244; H04N 1/32789; H04N 1/33392; H04N 1/41; H04N 1/44; H04N 2201/0039; H04N 2201/0093; H04N 2201/3218

See application file for complete search history.

(56) References Cited

U.S. PATENT DOCUMENTS

| 6,058,169 | A | * | 5/2000 | Bramnick | .......... H04N 1/00209 |
| | | | | | 358/407 |
| 6,414,758 | B1 | | 7/2002 | Stovall | |
| 7,218,424 | B2 | | 5/2007 | Cohen | |
| 7,480,065 | B1 | | 1/2009 | Trandal et al. | |
| 7,869,076 | B1 | | 1/2011 | Trandal et al. | |
| 8,081,337 | B2 | | 12/2011 | Trandal et al. | |
| 8,199,349 | B2 | | 6/2012 | Narahara | |
| 8,243,314 | B2 | | 8/2012 | Oliszewski | |
| 8,249,230 | B1 | | 8/2012 | Watts | |
| 8,339,346 | B2 | | 12/2012 | Li et al. | |
| 2001/0012343 | A1 | | 8/2001 | Dal Molin | |

(Continued)

FOREIGN PATENT DOCUMENTS

WO    WO-9834399    8/1998

*Primary Examiner* — Stella Woo

(57) ABSTRACT

Described herein is a fax processing system that improves the speed and reliability of fax transmissions via a data communications network and provides a new method of transmitting facsimile images. Fax images are encoded with an embedded bit signal by a fax software program on the originating fax, where such bit signal is recognized by fax software at a fax service such that the original image data is transferred to the fax service via a secure link over a data communications network at internet speeds and notifies the fax service software with a confirmation.

8 Claims, 4 Drawing Sheets

(56) References Cited

U.S. PATENT DOCUMENTS

| | | | |
|---|---|---|---|
| 2001/0033642 A1* | 10/2001 | Abrishami | H04L 47/10 379/100.01 |
| 2005/0110616 A1* | 5/2005 | Kajiwara | H04L 12/66 340/286.01 |
| 2005/0200891 A1* | 9/2005 | Cohen | H04N 1/0022 358/1.15 |
| 2005/0275874 A1 | 12/2005 | Rothwell | |
| 2006/0072150 A1* | 4/2006 | Justice | H04N 1/00209 358/1.15 |
| 2007/0086061 A1* | 4/2007 | Robbins | H04N 1/32133 358/400 |
| 2009/0303548 A1 | 12/2009 | Harrington | |
| 2010/0208726 A1* | 8/2010 | Oliszewski | H04N 1/32704 370/352 |
| 2010/0296121 A1* | 11/2010 | Shaheen, III | H04N 1/00214 358/1.15 |
| 2011/0096369 A1 | 4/2011 | Trandal et al. | |
| 2011/0109936 A1* | 5/2011 | Coffee | H04N 1/00214 358/1.15 |
| 2012/0087484 A1 | 4/2012 | Trandal et al. | |
| 2012/0262761 A1* | 10/2012 | Ulybin | H04N 1/32789 358/407 |
| 2014/0050101 A1* | 2/2014 | Ulybin | H04L 41/5038 370/242 |
| 2015/0103379 A1 | 4/2015 | Basil | |

* cited by examiner

SYSTEM AND METHOD FOR GUARANTEED HIGH SPEED FAX DELIVERY

CROSS-REFERENCE TO RELATED APPLICATIONS

The present application claims the benefit of the U.S. Provisional Patent Application No. 61/891,341, filed on Oct. 15, 2013 and entitled "System and Method for Guaranteed High Speed Fax Delivery" which is herein incorporated by reference in its entirety; the U.S. Provisional Patent Application No. 61/927,716, filed on Jan. 15, 2014 and entitled "System and Method for Guaranteed High Speed Fax Delivery" which is herein incorporated by reference in its entirety; the U.S. Provisional Patent Application No. 61/891,352, filed on Jan. 15, 2013 and entitled "System and Method for Guaranteed High Speed Fax Delivery With A Fax Adapter" which is herein incorporated by reference in its entirety; the U.S. Utility patent application Ser. No. 14/514,890, filed on Jan. 15, 2014 and entitled "System and Method for Guaranteed High Speed Fax Delivery With A Fax Adapter" which is herein incorporated by reference in its entirety

BACKGROUND

The electronic transmission of documents by way of fax systems continues to be commonplace and, often, an essential component of many business activities. With the emergence of email and mobile computing devices in the business environment, many predicted the demise of fax, however fax continues to thrive and grow as it is the only means of communication to the existing base of fax machines, can print out paper, and offers compliance to many financial and regulatory requirements.

However, there continue to be shortcomings among the fax systems currently in use in the business and consumer markets. With the growth of VoIP (Voice over Internet), fax transmissions designed for the PSTN (Public Switched Telephone Network) have more difficulty completing transmissions and require several retries to complete. Further, as the number of pages increase, the chances of successful transmissions decrease. Also, there is no page counting system in fax, so that a 100 page fax that cannot complete after 90 pages will start anew at page 1 the next attempt. And finally, that 100 page fax may take as long as an hour or more of a phone call to complete the transmission.

Facsimile ("fax" or "faxing") has been an important part of business communications for over 20 years. It is a secure, and reliable way to send a document from one place to another and provides a confirmation of receipt. There have been few changes to the actual fax transmissions or speed since the early 1990's. With the growth of VoIP and the growth of fax, more problems are introduced to the fax process such as dropped calls, incomplete faxes, and longer documents that can take long periods of time sending.

The present invention overcomes problems in the current fax system and in prior art of fax systems by using the fax transmission as a signal to securely stream the fax image data via the internet and greatly reducing the transmission time.

Non-facsimile-communication-protocol/non-facsimile-image digital data may be reproduced by a non-featured facsimile machine, but the non-facsimile-communication-protocol/non-facsimile-image digital data will be rendered in a manner that does not produce intelligible human-readable information to the recipient.

Non-facsimile-communication-protocol/non-facsimile-image digital data is also multi-bit digital data representing non-facsimile-communication-protocol information wherein facsimile-communication-protocol information is signals or instructions to create/facilitate a communication channel between a transmitting device and a receiving device.

In summary, non-facsimile-communication-protocol/non-facsimile-image digital data is machine readable data that is transmitted in addition to conventional facsimile data wherein if the non-facsimile-communication-protocol/non-facsimile-image digital data is reproduced by the receiving facsimile machine, the non-facsimile-communication-protocol/non-facsimile-image digital data does not produce intelligible human-readable information as the receiving facsimile machine would render the concurrently transmitted conventional facsimile data.

DEFINITION OF TERMS

The following term definitions are provided to assist in conveying an understanding of the various exemplary embodiments and features disclosed herein. The terms "facsimile" and "fax" shall be used interchangeably and refer to data that is transmitted on the protocol generically known as "T.30".

Facsimile Image Document: A scanned document that is encoded pursuant to a known facsimile standard via a series of linear image data bits.

Telephony: The transmission of audio signals on a PSTN ("Packet Switched Telephony Network") according to generally accepted protocols.

T.30: The protocol for the transmission of facsimile image data that conform to the "Group-3" protocol. The Group 3 protocol is defined by the ITU, International Telecommunications Union PSTN: The public switched telephone network (PSTN) is the network of the world's public circuit-switched telephone networks.

ANI: Automatic Number Identification.

Facsimile Information Fields (FIF): Information fields of variable length that contain specific information for the control and message interchange between two facsimile terminals.

Non Standard Capabilities: Refers to the NSF (Non Standard Facilities), NSC (Non Standard Facilities Command), and NSS (Non Standard Facilities Set-up).

Fax Communications Speeds: refers to the T.30 defined modem speeds of Group 3 facsimile. Several different telephone line modulation techniques are used by fax machines. They are negotiated during the fax-modem handshake, and the fax devices will use the highest data rate that both fax devices support, usually a minimum of 14.4 kbit/s for Group 3 fax.

V.27: 2400 and 4800 bits/second.
V.29: 4800, 7200, and 9600 bits/second.
V.17: 7200, 9600, 12,200, and 14,400 bits/second
V.34bis: 28,800 and 33,600 bits/second.

Data Communications Speeds: refers to data rate transfer speeds found on wired or wireless data network connections. There is a large range of available speeds which can go to 10 Mbps (megabits/second) or much higher, versus fax connection speeds as described above.

Transport Protocols refer to the OSI model level 4 of protocols including but not limited to TCP and UDP.

Application Layer Protocols refer to the OSI model level 7 protocols including but not limited to HTTP, RTP, TFSP, FTP.

Internet Layer Protocols refer to the internet internetwork protocols including but not limited to IP, IPv4, IPv6, IPsec.

SUMMARY

It is one object of this inventive subject matter subject matter to provide for a fax processing system that overcomes some or all of the drawbacks discussed above. It is therefore an object to provide a system and method of ultra-high speed fax transmission that is optimized and can also provide a secure confirmation and delivery of the transmission.

Another object of the present inventive subject matter is to reroute fax calls initiated from a PC fax program, that are intended to connect through a fax service, and through an internet link using internet protocols.

Another object of the inventive subject matter subject matter is to encode the first page of a fax image with a code of bits that are recognized by a software decoder program at the fax service provider or fax server recipient. The software decoder program has the capability to recognize the encoded bits in the image, and also has the capability to recognize in the T.30 header, the Non Standard Capabilities codes and Facsimile Information Field, Customer Subscriber Identification ("CSID"), and from the telecommunications system, the phone number from the originating device via Automatic Number Identification ("ANI") or Caller Identification ("Caller ID") and the time of the originating facsimile call. When the software decoder program recognizes such above described codes, the software confirms that the originating fax call comes from the PC Fax program installed and operating on the originating computing device, the software application signals the fax program with an acknowledgement. After the acknowledgement signal, the fax program uses the T.30 fax protocol to set the transmission speed to any of the desired T.30 supported modem speeds; the object of setting the speed to a slower speed is to keep the transmission channel open while the fax program performs its other intended function.

Another object of the inventive subject matter subject matter is for the fax software decoder software to set up a secure link to the fax service server and notifies the fax software encoder software of the address of the secure link. The fax program then proceeds to transfer the bytes of the facsimile image data via any transport layer, application layer, or internet layer protocols to the designated web server. Encryption may or may not be used. The fax transmission is terminated after the receiving server issues a confirmation to the fax software decoder software that the facsimile image data was received.

Thus, the original fax image was sent to an accessible server at internet speeds rather than at traditional telephony speeds, also facsimile transmissions typically experience a 10%-30% failure rate that necessitate retrying the fax transmission a second time or third time.

Another object of the invention is to reduce the telephony and computing resources used by the fax service by streaming fax image data to the fax server at internet speeds.

BRIEF DESCRIPTION OF THE DRAWINGS

The above and other objects, features, and advantages of the present invention are further described in the detailed description which follows, with reference to the drawings by way of non-limiting exemplary embodiments of the present invention, wherein like reference numerals represent similar parts of the present invention throughout the several views.

DETAILED DESCRIPTION

Although the detailed description herein contains many specifics for the purposes of illustration, anyone of ordinary skill in the art will appreciate that many variations and alterations to the following details are within the scope of the embodiments described herein. Thus, the following illustrative embodiments are set forth without any loss of generality to, and without imposing limitations upon, the claimed invention.

Figure 1:
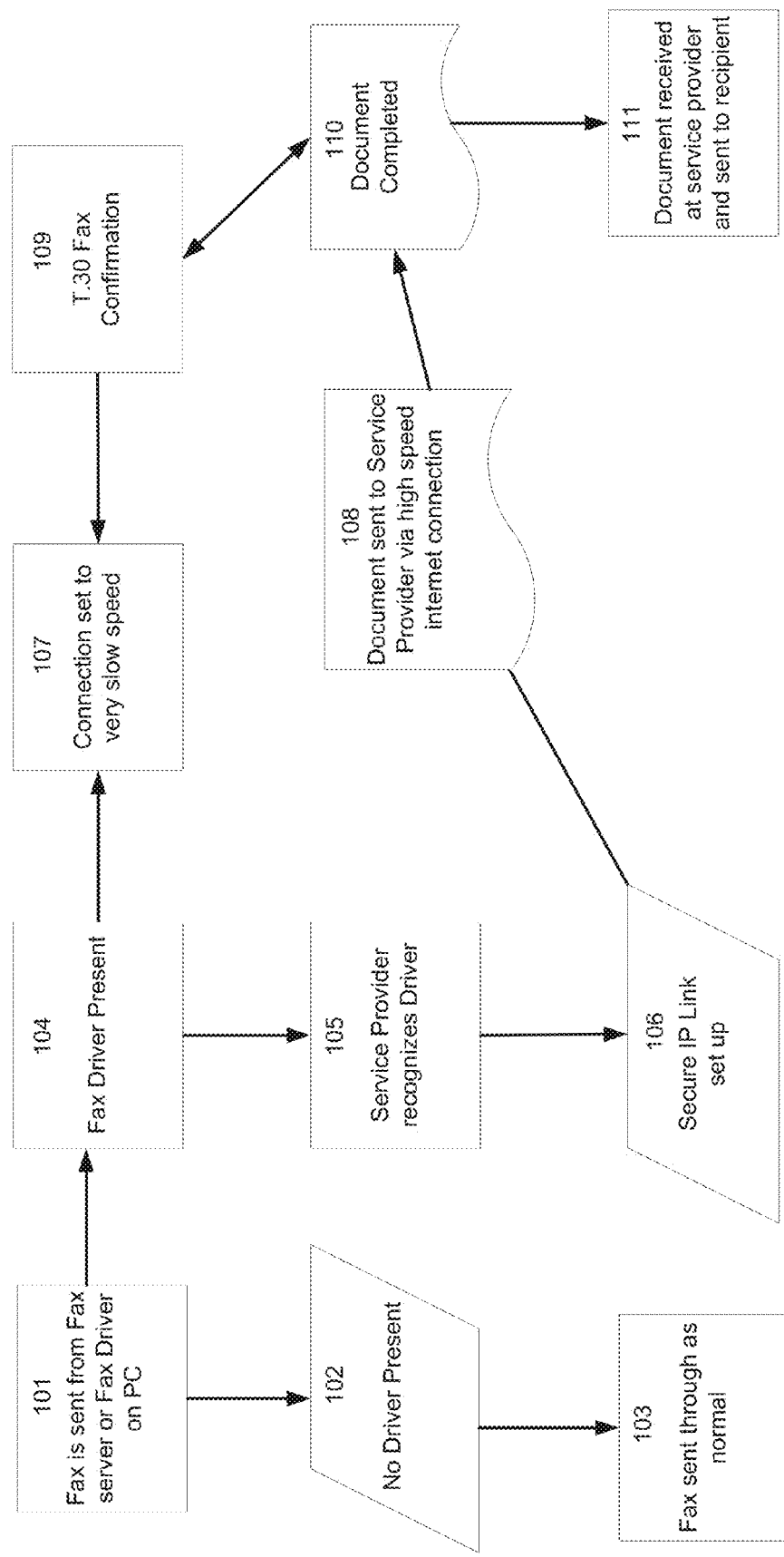
FIG. 1 is a block diagram showing the process of sending a fax from the originating fax system, the receiving system recognizing the originating source and setting up the secure IP link, keeping the telecommunications link open with a slower speed while streaming the fax image data to the designated location over the internet, and sending a confirmation back to the originating fax system.
Figure 3:
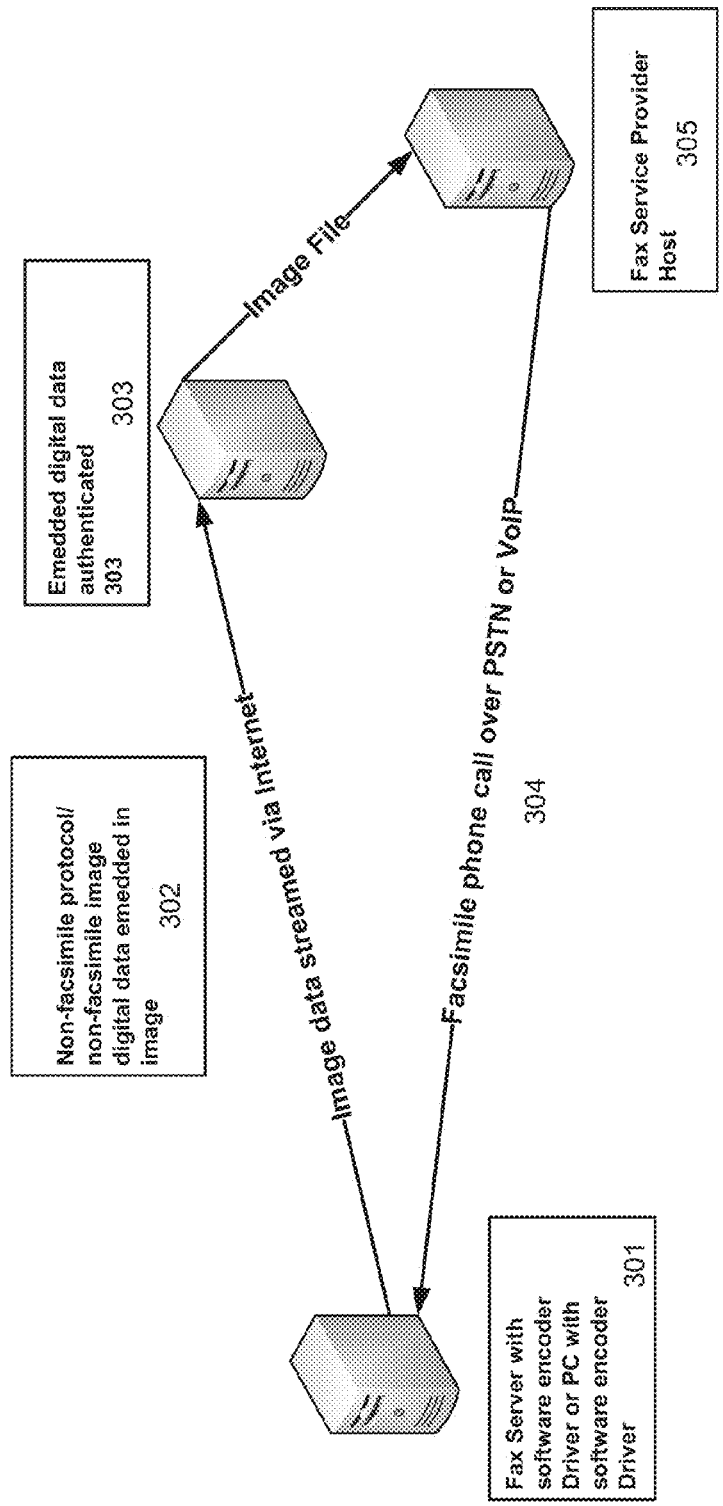
FIG. 3 is a diagram showing the originating fax server with a standard fax call connection to a remote service provider, the fax software encoder embeds non-facsimile-communication-protocol/non-facsimile-image digital data bits in the facsimile image, and a data communications link wherein the image data is streamed to the designated server location at internet speeds.

Now referring to FIGS. 1 and 3 which depict a flow and system diagram respectively of a fax delivery system with capabilities according to the inventive subject matter. The novelty of the system is based on the ability to stream a facsimile image data over a data communications network such as the internet to a receiving facsimile system; in this case, the facsimile image data is being sent at internet speeds, rather than at traditional facsimile modem speeds over a T.38 internet link as previously done.

Figure 2:
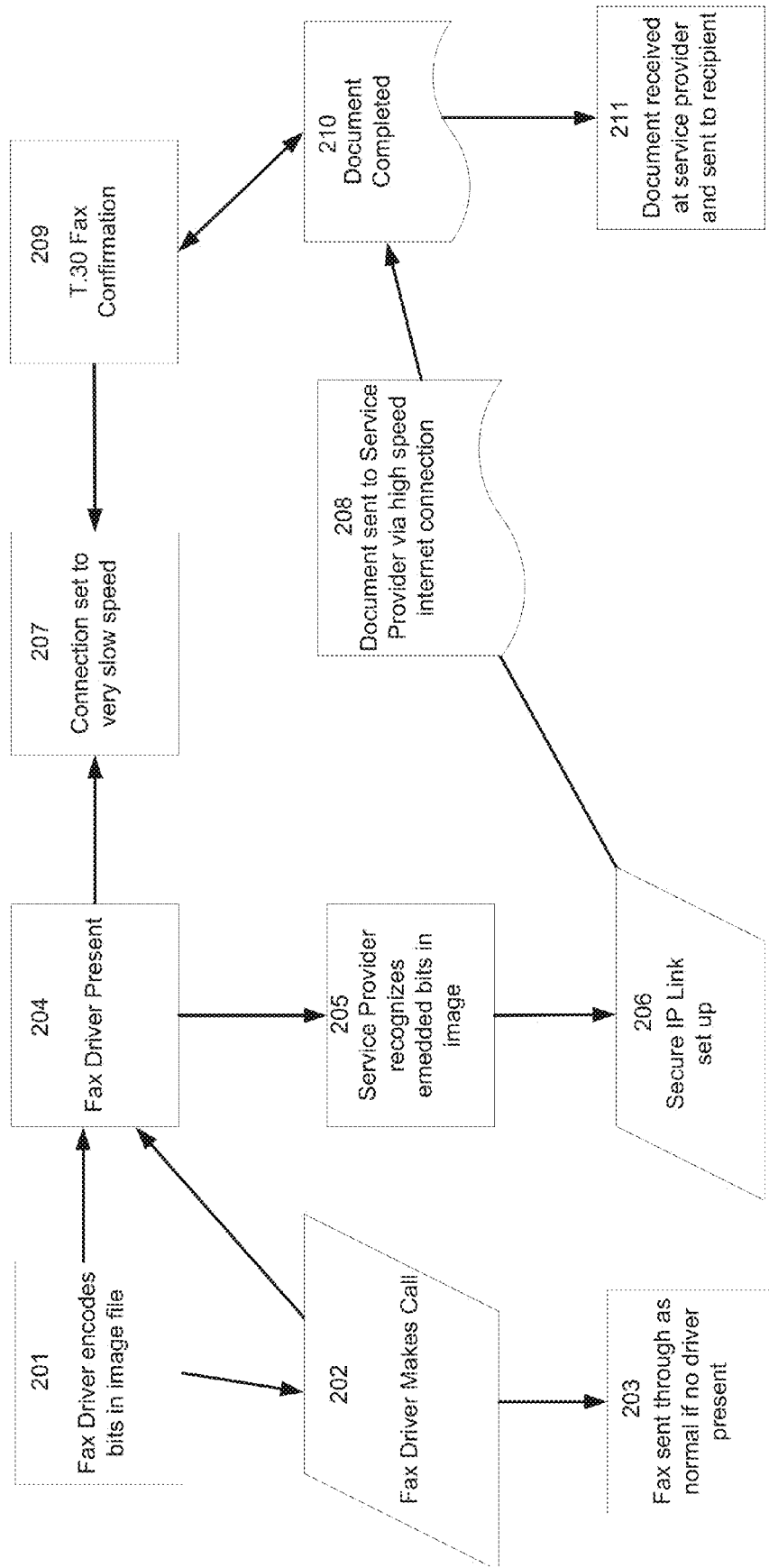
FIG. 2 is a block diagram showing the process of sending a fax from the originating fax system, where the fax software encoder embeds non-facsimile-communication-protocol/non-facsimile-image digital data bits in the facsimile image, wherein the receiving system recognizes the embedded non-facsimile-communication-protocol/non-facsimile-image digital data bits from the software encoder, sets up the secure IP link, keeping the telecommunications link open with a slower speed while streaming the fax image data to the designated location over the internet, and sends a confirmation back to the originating fax system.
Figure 4:
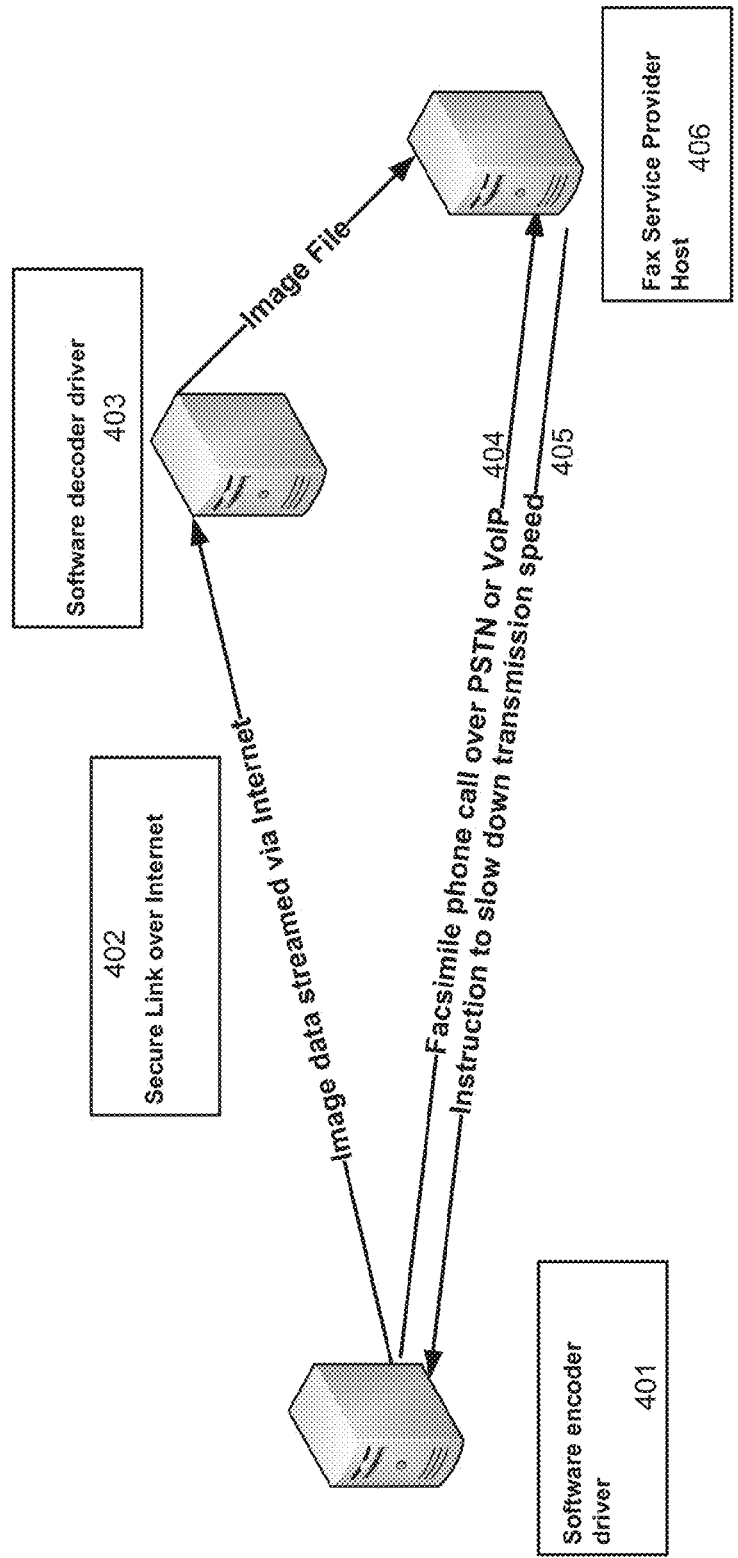
FIG. 4 is a diagram showing the originating fax server with a standard fax call connection to a remote service provider, with instruction sent from the software decoder program to slow down the facsimile transmission speed.

Now also referring to FIGS. 2, 3 and 4 which depict the facsimile driver and a system diagram of the guaranteed fax delivery system. The sender's fax originates from a computer based file (not shown) as prepared on a fax server 301 that is converted to facsimile image data by a fax driver 101 and software encoder driver 401 that resides either on an individual computer, or a network based computer fax server. The fax program initiates a call 202 to a receiving fax system. If the receiving fax system is a standard fax machine, or a fax service that does not have the supplied program in the driver 102, then the fax is transmitted as a normal T.30 fax, 103 in FIGS. 1 and 203 in FIG. 2, if connected to the Public Switched Telephone Network (PSTN) or T.38 fax is connected to a data communications network such as the internet, 304. In the case where the fax driver is detected to be present 104 in FIGS. 1 and 204 in FIG. 2, the service provider 305 in FIGS. 3 and 406 in FIG. 4 that has the fax driver operating, will recognize that the driver exists on the sending end 105, and further recognize the embedded bits in the fax image 205.

The sender's fax program encodes hidden bits into the facsimile image data 201 in FIGS. 2 and 302 in FIG. 3. If the fax call is answered by any fax service, such as a public or private service provider, or any customer owned fax system with a compatible fax program, the encoded bits in the fax image will be recognized, 205 in FIGS. 2 and 303 in FIG. 3, so that the receiving fax program will send a secure IP (internet protocol) link to the sending fax program 206 in FIGS. 2 and 402 in FIG. 4. The hidden bits also signal the software decoder program the number of bytes that are contained in the image data.

The sender's fax originates from a computer based file that is converted to facsimile image data by a fax program in a fax server/driver 101 that resides either on an individual computer, or a network based computer fax server. The fax program initiates a call 202 to a receiving fax system. If the receiving fax system is a standard fax machine, or a fax service that does not have the supplied program in driver 102, then the fax is transmitted as a normal T.30 fax if connected to the Public Switched Telephone Network (PSTN), 203 or as a T.38 fax if connected to a data communications network such as the internet.

In addition, the sending software encoder program may send a message to the receiving decoder program using the Non Standard Capabilities or Fax Information Field of the T.30 protocol to signal the decoder program to perform the functions as if there were bits encoded in the facsimile image. The receiving software decoder program then receives and authenticates the message.

Further, the software encoder program has the capability to and may calculate a checksum on the facsimile image data using one or more of the number of bytes of the image data, the number of pages of the image data, a unique identifier of the image data and a unique identifier of the software encoder program. The software decoder program also has the capability and may calculate a checksum based on the same criteria such that the checksum on the same facsimile image data and same intended destination will match and may be used for future validation of the facsimile image data.

At this point, the fax transmission call is set to a slower speed 207 in FIGS. 2 and 405 in FIG. 4. Group III fax speeds are typically either sent at V.17 (9600 bps to 14.4 bps) or V.34 (up to 33.6 bps), however, operating at the higher speeds increases the error rate of facsimile transmissions, and increases the potential for a failed transmission. Setting the modem transmission speed to a much slower speed helps ensure that the communication link stays open and active while the streaming portion of the fax image is processed.

After the secure IP link is received by the fax sending program, the image data is then streamed via the data communications (Internet) link to the provided server address using any available Transport Layer, Application Layer, or Internet Layer Protocols 208 in FIG. 2, 302 in FIG. 3, 402 in FIG. 4.

The fax image data is then streamed to the destination server at the service provider or network fax server at the high speed of the data communications network, 108 in FIG. 1, 208 in FIGS. 2 and 402 in FIG. 4, rather than at the ITU specified modem speeds; this has the novel advantages of transmitting multi-page faxes at much faster speeds than previously possible as well as reducing network congestion of limited resources to process traditional voice or fax modem calls (transmissions).

When the fax image data is streamed to the designated secure location, the software decoder program of the receiving system recognizes the completion of the transmission 210 by having the number of expected bytes received as notified by the software encoder program of the sender. The software decoder program then proceeds to send a T.30 confirmation signal 209 over the still open standard facsimile transmission link, which terminates the call. The software encoder program at this point may inform and third party software application that the fax transaction is confirmed and complete. Note that at the time of confirmation, the facsimile data image has already been received at the fax service or fax server location, and the confirmation time and date stamp are officially recorded in the facsimile transmission and serves as legal proof that the facsimile document was sent.

I claim:

1. A facsimile system for the real-time delivery of facsimile image data of a facsimile communication call comprising:
    a software encoder program capable of encoding non-facsimile image digital data bits in an image data;
    a software decoder program capable of authenticating the non-facsimile-image digital data bits in the image data sent from the software encoder program;
    the software encoder program capable of sending a message to the software decoder program, the message is selected from a group consisting of a checksum, a number of pages, a number of bytes, a unique identifier of the facsimile image, a unique identifier of the software encoder program, a customer subscriber identification field, a non-standard capabilities field or a fax information field;
    the software decoder program capable of recognizing the message from the software encoder program and authenticating the facsimile image data and sending an internet link to stream the facsimile image data;
    the software encoder program capable of streaming the facsimile image data through the internet link using a transport layer, application layer or internet layer protocol;
    the software decoder program capable of controlling a transmission speed of the facsimile image data;
    the software decoder program capable of sending a confirmation message to the software encoder program, the confirmation message is selected from a group consisting of a checksum received, a number of received pages, a number of received bytes, or a unique identifier of the received facsimile image data;
    the software decoder program capable of detecting if the streamed facsimile image data via the internet is complete;
    the software decoder program capable of sending a T.30 confirmation signal to the software encoder program confirming a completion of the facsimile communication call and terminating the facsimile communication call.

2. The facsimile system for the real-time delivery of facsimile image data of a facsimile communication call as described in claim 1, wherein the software decoder program further comprising the capability of
    setting a transmission speed to any T.30 supported modem speed for a purpose of slowing down the transmission speed based on a T.30 handshaking protocol.

3. The facsimile system for the real-time delivery of facsimile image data of a facsimile communication call as described in claim 1, wherein the software encoder program further comprising:
  capable of encoding any ITU T.30 defined facsimile information field withnon-facsimile-image digital data bits, and
  encoding any ITU T.30 defined facsimile information field with non-facsimile-image digital data bits,
  such that the ITU T.30 defined facsimile information field provides a message to the software decoder program.

4. The facsimile system for the real-time delivery of facsimile image data of a facsimile communication call as described in claim 1, wherein the software decoder program further comprising:
  the capability to authenticate non-facsimile-image digital data bits in one or more of any of a defined non-standard capabilities or facsimile information fields of a ITU T.30 specification.

5. The facsimile system for the real-time delivery of facsimile image data of a facsimile communication call as described in claim 1, wherein the software decoder program uses one or more of the following to calculate a checksum:
  originating facsimile phone number,
  non-facsimile-image digital data information in one or more of the number of pages in the facsimile image data,
  the number of bytes in the facsimile image data,
  a unique identifier of the facsimile image data and a unique identifier of the software encoder program;
  wherein said checksum is used for a purpose future validation of the facsimile image data.

6. The facsimile system for the real-time delivery of facsimile image data of a facsimile communication call as described in claim 1, wherein the software encoder program further comprising:
  receiving a confirmation from the software decoder program;
  informing a third party facsimile application that the facsimile communication call is confirmed and complete.

7. A method of real time delivery of facsimile image data of a facsimile communication call comprising the steps of:
  encoding of non-facsimile image data bits in an image document by a software encoder program;
  authenticating the non-facsimile-image digital data bits in the image data sent from the software encoder program by a software decoder program;
  the software encoder program sending a message to the software decoder program, the message is selected from a group consisting of a checksum, a number of pages, a number of bytes, a unique identifier of the facsimile image, a unique identifier of the software encoder program, a customer subscriber identification field, a non-standard capabilities field or a fax information field;
  the software decoder program recognizing the message form the software encoder program and authenticates the facsimile image data and sends an internet link to stream the facsimile image data;
  the software encoder program streaming the facsimile image data through the internet link using a transport layer, application layer or internet layer protocol;
  the software decoder program controlling a transmission speed of the facsimile image data;
  the software decoder program sending a confirmation message to the software encoder program, the message is a checksum received, a number of received pages, a number of received bytes, or a unique identifier of the received facsimile image data:
  the software decoder program detecting that the streamed image data via the internet link is complete; and
  the software decoder program sending a T.30 confirmation signaling a completion of the facsimile communication call to the software encoder program and terminating the facsimile communication call.

8. The method of real time delivery of facsimile image data of a facsimile communication call described in claim 7 wherein the software decoder program further comprises:
  passing a facsimile communication call through as directed by a receiving facsimile system if no message is detected to have been sent by the software encoder program.

* * * * *